Patented Nov. 16, 1948

2,453,692

UNITED STATES PATENT OFFICE 2,453,692

4-CYANO-2,5-DIALKOXYACETO-ACETANILIDES

William H. von Glahn, Loudonville, and Herman A. Bergstrom, Albany, N. Y., assignors to General Aniline & Film Corporation, New York, N. Y., a corporation of Delaware No Drawing. Application August 22, 1947, Serial No. 770,190

3 Claims. (Cl. 260—465)

The present invention relates to azo dye coupling components useful in the manufacture of azo dyes and pigments and to the azo dyes produced therefrom.

We have discovered that azo dyes and pigments having strong shades of yellow can be produced either in substance or on the fiber by employing as the coupling component 4-cyano-2,5-dialkoxyacetoacetanilides. The dyestuffs are excellently suited for dyeing and printing textile materials of various kinds, such as, cotton, silk, rayon, acetate silk, and the like. Said 4-cyano-2,5-dialkoxyacetoacetanilides and the azo dyes produced therefrom by coupling with diazonium compounds constitute the purposes and objects of the present invention.

The coupling components contemplated herein have the following structural formula:

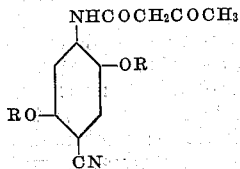

in which R is alkyl, such as, methyl, ethyl, propyl, butyl, amyl, and the like. Said compounds are prepared by reacting 4-amino-2,5-dialkoxy benzonitriles with ethylacetoacetate. The 4-amino-2,5-dialkoxy benzonitriles are known compounds as may be seen from a reference to U. S. P. 2,153,539 and 2,180,297.

The aforesaid coupling components can be employed with any of the usual diazo compounds. Amines from which such diazo compounds may be prepared are listed, for instance, in U. S. P. 2,378,276 and 2,378,305. Typical examples of such amines are 5-chloro-o-toluidine, 4'-amino-2',5'-diethoxy benzanilide, 4-chloro-o-toluidine, 5-chloro-o-anisidine, 3,3'-dimethoxy benzidine, 2,5-xylidine, and the like.

When the dyes are to be prepared on the fiber the 4-cyano-2,5-dialkoxyacetoacetanilides may be applied to the fiber and developed by treatment with a diazo component. Alternatively, said coupling components may be applied in combination with a stabilized diazo, i. e., in the form of a diazoamino compound, a metal complex of a diazonium compound, a nitrosamine, or the like, according to the usual practice.

The dyestuffs produced according to the present invention have the following structural formula:

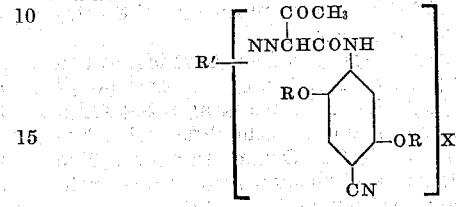

wherein R' is an aromatic radical such as phenyl, tolyl, naphthyl, carbazolyl, 4-chloro-o-tolyl, 5-chloro-o-tolyl, 5-chloro-o-anisyl, 4-benzamido-2,5 - diethoxyphenyl, 4 - cyano - 2,5 - dimethoxyphenyl, 3,3'-dimethoxydiphenyl, 2,5-dimethylphenyl, 4-nitro-o-tolyl, 5-(N,N-dimethylsulfamyl)-o-tolyl, ethoxyphenol and the like; and R is alkyl, such as, methyl, ethyl, propyl, butyl, amyl, and the like.

The following examples will serve to illustrate the invention but it is to be understood that the invention is not limited thereto.

The parts are by weight unless otherwise stated.

Example 1

To a 4 liter 4 necked flask fitted with an agitator, a thermometer, distilling column, condenser and a dropping funnel, there are added 700 parts by volume of dry xylol and 2 parts of soda ash. 100 parts by volume of xylol are distilled off to dry the equipment. 130 parts of ethylacetoacetate are then added and while distilling under agitation 178 parts of 4-amino-2,5-dimethoxy benzonitrile dissolved in 2000 parts by volume of hot xylol are added. The mixture is distilled for two hours longer, cooled to 20° C., filtered and washed with 350 parts by volume of xylol. The product is dried at a temperature of 90° C., a good yield of high purity being obtained. The melting range is 158° to 159° C.

The reaction is illustrated by the following equation:

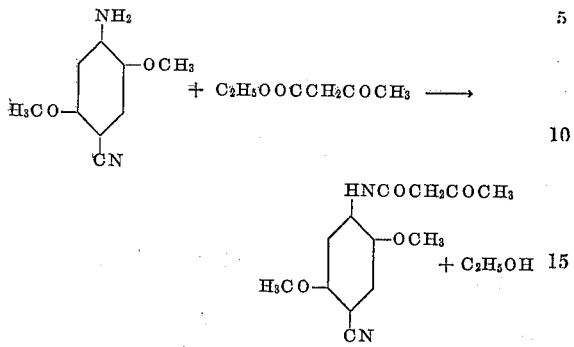

Example 2

The procedure is the same as in Example 1 excepting that the 4-amino-2.5-dimethoxy benzonitrile is replaced by an equivalent amount of 4-amino-2.5-diethoxy benzonitrile.

The following examples illustrate the use of the coupling component of Example 1 in the preparation of azoic pigments.

Example 3

14.15 parts of 5-chloro-o-toluidine are diazotized in 30 parts by volume of hydrochloric acid of 21° Bé. in the presence of 100 parts of water and enough ice to lower the temperature to 0° C. by means of a sodium nitrite solution containing 6.9 parts of 100% sodium nitrite. The reaction mixture is agitated for an hour.

26.2 parts of 4-cyano-2.5-dimethoxyacetoacetanilide are dissolved in 250 parts of water by means of caustic soda, 20 parts of sodium acetate crystals are added to the solution and the solution neutralized with acetic acid.

The diazo solution prepared as above is now run into the slurry containing the cyano dimethoxyacetoacetanilide. The mixture is agitated for a half an hour whereupon it is acidified with hydrochloric acid to a test on Congo red paper. The mixture is filtered and washed acid free to yield a bright greenish yellow pigment of the following probable formula:

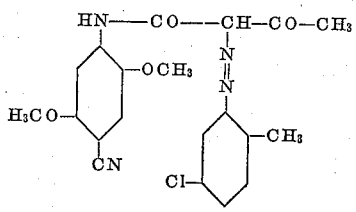

Example 4

30 parts of 4'-amino-2'.5'-diethoxybenzanilide are diazotized and coupled with 4-cyano-2.5-dimethoxyacetoacetanilide as in Example 3. A bright orange pigment is obtained, said product having the following probable formula:

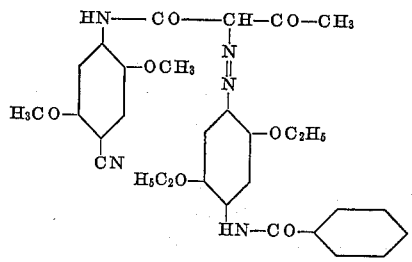

Example 5

14.15 parts of 4-chloro-o-toluidine are diazotized and coupled with 4-cyano-2.5-dimethoxyacetoacetanilide according to the procedure of Example 3. A bright greenish yellow pigment, very fast to light and having the following formula, is obtained:

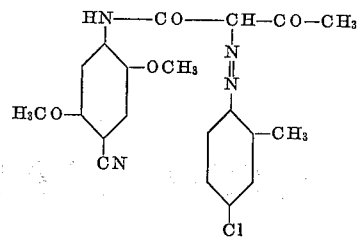

Example 6

17.8 parts of 4-amino-2.5-dimethoxybenzonitrile are diazotized and coupled with 4-cyano-2.5-dimethoxyacetoacetanilide according to the procedure of Example 3. A bright yellow pigment having the following probable formula is obtained:

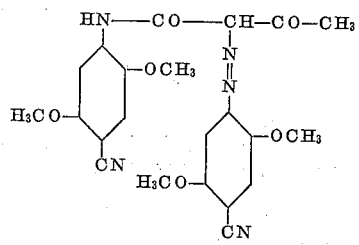

Example 7

24.4 parts of 3.3'-dimethoxybenzidine are diazotized in 60 parts by volume of 21° Bé. hydrochloric acid, 200 parts of water and enough ice to lower the temperature of 0° C. by means of a solution containing 13.8 parts of 100% sodium nitrite. The mixture is agitated for an hour.

52.4 parts of 4-cyano-2.5-dimethoxyacetoacetanilide are dissolved in 500 parts of water by means of caustic soda solution. To the latter solution 40 parts of sodium acetate crystals are added and the solution neutralized with acetic acid.

The diazo solution obtained as above is now run into the latter slurry and the mixture agitated for one-half hour whereupon it is acidified with hydrochloric acid to a test on Congo red paper. The mixture is filtered and washed acid free to yield a bright orange pigment of the following probable formula:

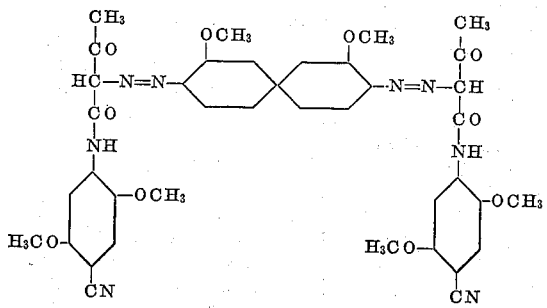

The following examples illustrate the use of 4-cyano-2.5-dimethoxyacetoacetanilide in the preparation of azoic dye mixtures with soluble stabilized diazoamino compounds for printing silk, rayon, acetate silk, and the like.

Example 8

An intimate mixture is made from 41 parts of 100% dry stabilized diazoamino derivative of 5-chloro-o-anisidine stabilized with sarcosine and 41.8 parts of 4-cyano-2.5-dimethoxyacetoacetanilide. This mixture is standardized to 100 parts by adding sodium sulfate. 4 parts of the resulting mixture are dissolved in caustic soda solution and the solution thickened with a conventional thickener, such as, rice starch. This printing paste is then applied to the material in the usual way. A full bright yellow shade develops when the dried print is exposed to the fumes of acetic acid. The developed print is then soaped and finished in the customary manner. A bright greenish yellow dyestuff is obtained which has the following probable formula:

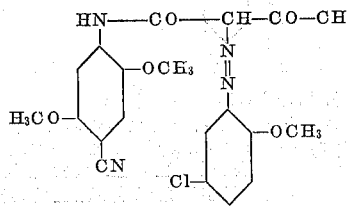

Example 9

An intimate mixture is made from 30.4 parts of 4-cyano - 2.5 - dimethoxyacetoacetanilide and 31.4 parts of 100% diazoamino compound of 2.5-xylidine stabilized with methyl taurine. The resulting mixture is standardized to 100 parts by the addition of sodium sulfate. The mixture is then treated and printed as in Example 8. A full yellow shade develops when the dried print is exposed to the fumes of acetic acid. The developed print is then soaped and finished according to customary procedure to yield the dyestuff of the following probable formula:

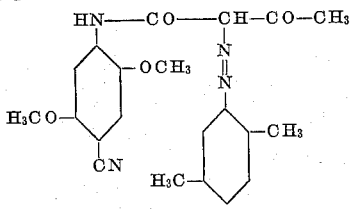

The following examples illustrate the use of 4-cyano - 2.5 - dialkoxyacetoacetanilides in dyeing cotton, silk, rayon, acetate silk, and the like.

Example 10

An alkaline solution is made by dissolving 3 parts of 4-cyano-2.5-dimethoxyacetoacetanilide in 1000 parts of water. The material to be dyed is impregnated with this solution by immersion in the solution for 20 minutes and then hydroextracted. The resulting impregnated material is next immersed for 20 minutes in a solution containing diazotized 4-nitro-o-toluidine. The dyed material is then after-treated in the usual manner to yield dyeings of a bright golden yellow shade. The dyestuff has the following probable formula:

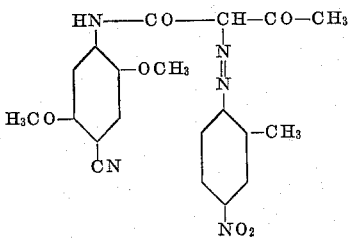

Example 11

The procedure is the same as in Example 10 excepting that the diazotized 4-nitro-o-toluidine is replaced by a solution of the stabilized zinc chloride salt of diazotized 4'-amino-6'-methyl-m-benzanisidide. The dyed material is after-treated in the usual way to yield dyeings of a yellow reddish shade. The resulting dyestuff has the following probable formula:

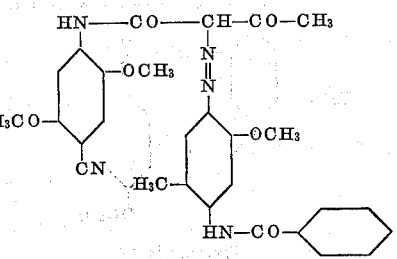

Example 12

The procedure is the same as in Example 10 excepting that the solution of the diazotized 4-nitro-o-toluidine is replaced by a solution of diazotized 4'-amino - 2'.5' - dimethoxybenzanilide. The dyed material is after-treated in the usual manner to yield dyeings of a bright yellowish orange shade. The dyestuff has the following probable formula:

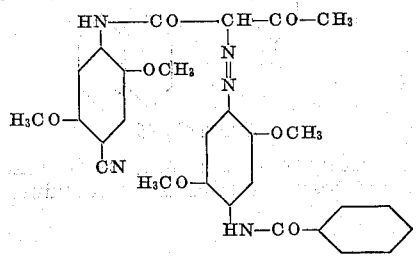

Example 13

An alkaline solution is prepared by dissolving 3 parts of 4-cyano-2.5-diethoxyacetoacetanilide in 1000 parts of water. The material to be dyed is impregnated for 20 minutes by immersion in this solution and then hydroextracted. The impregnated material is then immersed for 20 minutes in a solution containing diazotized 3-amino-N-N-dimethyl-p-toluenesulfonamide. The dyed material is after-treated in the usual way to yield dyeings of a bright yellow shade. The resulting dyestuff has the following probable formula:

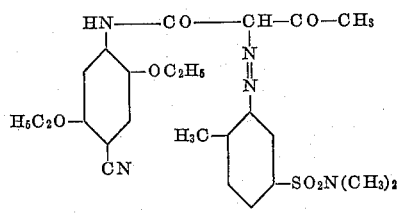

The following example illustrates the use of 4-cyano-2.5-diethoxyacetoacetanilide in preparing azoic dye mixtures with nitrosamines to be used in printing cotton, silk, rayon, acetate silk, and the like.

Example 14

An intimate mixture is made from 12.9 parts of the dry nitrosamine of p-phenetidine (100% strength), 27.3 parts of 4-cyano-2.5-diethoxyacetoacetanilide and 10 parts of pulverized caustic soda flakes. The mixture is then standardized to 100 parts by adding sodium sulfate. 4 parts of this mixture are dissolved in caustic soda solution and thickened with a conventional thickening agent. The printing paste is applied to cotton cloth in the usual manner and developed by means of acetic acid vapors. The developed print is then soaped and finished in the customary manner to yield dyeings of a bright yellow shade. The dyestuff obtained has the following probable formula:

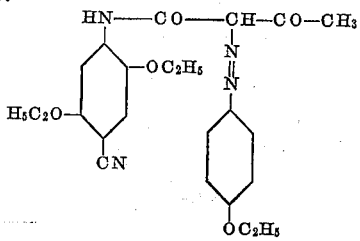

*Example 15*

The procedure is the same as in Example 3 excepting that the 5-chloro-o-toluidine is replaced by 14.3 parts of 1-naphthylamine. The product obtained is a yellow pigment having the following formula:

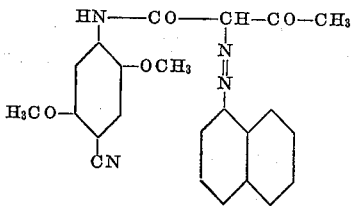

*Example 16*

The procedure is the same as in Example 3 excepting that the 5-chloro-o-toluidine is replaced by 15.8 parts of 2-amino-carbazole. The product obtained is a reddish yellow pigment of the following formula:

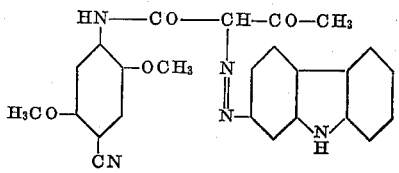

We claim:
1. Compounds of the following general formula:

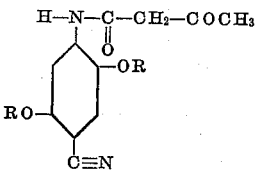

wherein R is alkyl.
2. 4-cyano-2.5-dimethoxyacetoacetanilide.
3. 4-cyano-2.5-diethoxyacetoacetanilide.

WILLIAM H. von GLAHN,
HERMAN A. BERGSTROM.

REFERENCES CITED

The following references are of record in the file of this patent:

UNITED STATES PATENTS

| Number | Name | Date |
|---|---|---|
| 1,933,431 | Henle et al. | Oct. 31, 1933 |
| 1,950,421 | Wahl | Mar. 13, 1934 |
| 2,044,015 | Perkins et al. | June 16, 1936 |
| 2,203,038 | Zitscher et al. | June 4, 1940 |

Certificate of Correction

Patent No. 2,453,692.  November 16, 1948.

WILLIAM H. VON GLAHN ET AL.

It is hereby certified that error appears in the printed specification of the above numbered patent requiring correction as follows:

Column 2, line 25, for the word "ethoxyphenol" read *ethoxyphenyl*;

and that the said Letters Patent should be read with this correction therein that the same may conform to the record of the case in the Patent Office.

Signed and sealed this 5th day of April, A. D. 1949.

[SEAL]

THOMAS F. MURPHY,
*Assistant Commissioner of Patents.*